(12) United States Patent
Kim et al.

(10) Patent No.: US 9,843,032 B2
(45) Date of Patent: Dec. 12, 2017

(54) BATTERY MODULE

(75) Inventors: Young Ki Kim, Daejeon (KR); Won Jun Lee, Daejeon (KR); Seung Bum Kim, Suwon-si (KR)

(73) Assignee: SK INNOVATION CO., LTD., Seoul (KR)

( * ) Notice: Subject to any disclaimer, the term of this patent is extended or adjusted under 35 U.S.C. 154(b) by 218 days.

(21) Appl. No.: 14/113,900

(22) PCT Filed: Apr. 27, 2012

(86) PCT No.: PCT/KR2012/003276
§ 371 (c)(1),
(2), (4) Date: Oct. 25, 2013

(87) PCT Pub. No.: WO2012/148211
PCT Pub. Date: Nov. 1, 2012

(65) Prior Publication Data
US 2014/0050954 A1 Feb. 20, 2014

(30) Foreign Application Priority Data

Apr. 27, 2011 (KR) .......................... 10-2011-0039628

(51) Int. Cl.
*H01M 2/34* (2006.01)
*H01M 2/30* (2006.01)
(Continued)

(52) U.S. Cl.
CPC ............. *H01M 2/34* (2013.01); *H01M 2/266* (2013.01); *H01M 2/30* (2013.01); *H01M 10/48* (2013.01);
(Continued)

(58) Field of Classification Search
CPC ....................................................... H01M 2/34
(Continued)

(56) References Cited

U.S. PATENT DOCUMENTS 7,198,866 B2   4/2007   Miyamoto et al.
7,538,516 B2   5/2009   Ha et al.
(Continued)

FOREIGN PATENT DOCUMENTS

JP   2004047167   2/2004
JP   2010519676   6/2010
(Continued)

OTHER PUBLICATIONS

International Search Report—PCT/KR2012/003276 dated Nov. 1, 2012.

*Primary Examiner* — Stewart Fraser
*Assistant Examiner* — Rachel L Zhang
(74) *Attorney, Agent, or Firm* — STIP Law Group, LLC

(57) ABSTRACT

Provided is a battery module in which at least one battery cell including an electrode tab including an anode tab and a cathode tab is stacked, including: a sensing assembly installed in a space between the anode tab and the cathode tab at a side of the battery module at which the electrode tab is positioned; and a terminal installed at the side of the battery module at which the electrode tab is positioned and connected to each of the electrode tabs of the battery cells positioned at the outermost portions, wherein the terminal is bonded and connected to a surface positioned at an inner side of the battery module in both sides of the anode tab and the cathode tab.

8 Claims, 5 Drawing Sheets

(51) Int. Cl.
  *H01M 10/48* (2006.01)
  *H01M 2/26* (2006.01)
  *H01M 10/42* (2006.01)

(52) U.S. Cl.
  CPC ............ *H01M 2/26* (2013.01); *H01M 10/425* (2013.01); *H01M 10/482* (2013.01); *H01M 2200/00* (2013.01)

(58) Field of Classification Search
  USPC .......................................................... 429/90
  See application file for complete search history.

(56) References Cited

U.S. PATENT DOCUMENTS

| | | | |
|---|---|---|---|
| 7,976,978 B2 | 7/2011 | Shin et al. | |
| 2011/0059342 A1* | 3/2011 | Lee .................... | H01M 2/1077 429/93 |
| 2012/0315522 A1* | 12/2012 | Shin .................... | H01M 2/1077 429/92 |

FOREIGN PATENT DOCUMENTS

| | | | |
|---|---|---|---|
| KR | 100472506 | | 2/2005 |
| KR | 1020060073433 | | 6/2006 |
| KR | 100628629 | | 9/2006 |
| KR | 1020060114549 | A | 11/2006 |
| KR | 1020060116424 | A | 11/2006 |
| KR | 1020060121173 | | 11/2006 |
| KR | 1020070010755 | | 1/2007 |
| KR | 100729106 | | 6/2007 |
| KR | 1020090105319 | | 10/2009 |
| WO | WO 2011126314 | * | 10/2011 |

* cited by examiner

BATTERY MODULE

TECHNICAL FIELD

The present invention relates to a battery module, and more particularly, to a battery module capable of being easily broken at the time of overcharge of electrode tabs of battery cells by changing positions of a terminal and a sensing terminal disposed at an outer side of an electrode tab positioned at the outermost portion to an inner side of the electrode tab and bonding the terminal and the sensing terminal to each other by welding to increase rigidity, in order to block power by breaking the electrode tabs of the battery cells for securing security of a battery at the time of generation of a phenomenon that the battery cells are swelled due to the overcharge in a battery module for a secondary battery.

BACKGROUND ART

Recently, a rechargeable secondary battery has been widely used as an energy source of a wireless mobile device.

In addition, the secondary battery has been prominent as a power source of an electric vehicle (EV), a hybrid electric vehicle (HEV), and the like, that have been suggested as a scheme for solving air pollution of an existing gasoline vehicle, a diesel vehicle, or the like, using a fossil fuel.

Small-sized mobile devices use one battery cell or several battery cells per one device. In contrast, medium and large-sized devices such as a vehicle, or the like, use a medium and large-sized battery pack in which a plurality of battery cells are electrically interconnected as unit cells, due to necessity of a high output and a large capacity.

Since it is preferable that the medium or large-sized battery packs are manufactured to have a size and a weight as small as possible, they may be stacked at a high degree of integration. In addition, a prismatic battery, a pouch type battery, or the like, having a small weight against a capacity has been mainly used as a battery cell of the medium or large-sized battery pack. Among them, an interest in the pouch type battery having a small weight and a low possibility for leakage of an electrolyte and requiring a low cost at the time of being manufactured has increased.

As unit batteries (battery cell) of the medium or large-sized battery pack, nickel-hydrogen secondary batteries have been mainly used. However, recently, many studies on lithium secondary batteries providing a high output against a capacity, similar to the small battery pack, have been conducted, and some of the lithium secondary batteries have been commercialized.

However, the lithium secondary battery basically has a problem that stability is low. Particularly, the pouch type battery is a leading candidate of a unit battery of the medium or large-sized battery pack due to various advantages as described above. However, the pouch type battery has problems that mechanical rigidity of a battery case is low and an ignitable material such as an electrolyte, or the like, is leaked when a sealing part is separated, such that a risk of a fire is high.

Further, in a lithium polymer battery using a pouch, since electrolytes are injected into cells integrated with each other, when the respective cells are over-charged, a voltage rises and the electrolytes in the cells are decomposed due to overheating, such that inflammable gas is generated in the cells. As a result, a swelling phenomenon that the pouch itself is swelled occurs. In addition, a separator between a cathode and an anode is melted to short-circuit the cathode and the anode, thereby causing a fire. Therefore, stability of the battery may not be secured.

Several studies have been variously and continuously conducted in order to solve these problems. These studies are mainly divided into two methods, that is, a method of chemically preventing over-charge and a method of electrically prevent over-charge, which will be described below in detail.

First, a technology of chemically preventing overcharge using a composition such as a non-aqueous electrolyte, a compound decomposed at the time of the overcharge, or the like, instead of a currently used electrolyte as an electrolyte has been disclosed in Korean Patent Registration No. 0472506, Korean Patent Registration No. 0628629, Korean Patent Laid-Open Publication No. 2006-0121173, and the like.

Second, a technology of electrically preventing overcharge by configuring a circuit blocking an electrical flow or allowing a fuse to be blown (due to overheating) when overheating, an overcurrent, or an overvoltage is generated has been variously disclosed.

As examples, an apparatus of stopping charging by short-circuiting power when a charging voltage becomes a predetermined voltage or more and an apparatus including a voltage sensing heat-generating device generating heat at a predetermined voltage or more and a temperature sensing device sensing the heat generated by the heat-generating device and reversibly turning on/off a current have been disclosed in Korean Patent Laid-Open Publication No. 2007-0010755 (entitled "Apparatus of Stabilizing Secondary Battery") and Korean Patent Registration No. 0729106 (entitled "Safety Device for Preventing Overcharge and Secondary Battery Having the Same Coupled Thereto"), respectively.

Describing the technologies according to the related art as described above, first, in the case of the method of chemically preventing overcharge, performance is lower as compared with a currently used electrolyte, such that additional development is required. Further, in the case of the method of electrically preventing overcharge, since an independent circuit should be configured and be attached to a battery, the number of electronic components for a configuration is increased, such that it is difficult to manufacture an apparatus and a cost required to manufacture the apparatus is increased. In addition, a design of a circuit is complicated, such that a cost required to design the circuit is increased.

Further, in the case of an apparatus of blocking electricity using overheating, an overcurrent, an overvoltage, or the like, although the number of used components is smaller as compared with the method of providing the independently configured circuit to the battery, the problem as described above may not be completely avoided in that the additional circuit is provided in the battery.

Meanwhile, in order to solve the problems as described above, as shown in FIG. 1, a method in which a battery cell 11 positioned at the outermost portion of a battery module 10 is separated outwardly, such that an electrode tab 12 is broken, thereby blocking power is used. However, in the battery module 10 according to the related art, a terminal 14 and a sensing terminal 14 are positioned at an outer side of the electrode tab 12 positioned at the outermost portion and are not connected to each other to hinder the electrode tab 12 from being broken.

DISCLOSURE

Technical Problem

An object of the present invention is to provide a battery module capable of being easily broken at the time of overcharge of electrode tabs of battery cells by changing positions of a terminal and a sensing terminal disposed at an outer side of an electrode tab positioned at the outermost portion to an inner side of the electrode tab and bonding the terminal and the sensing terminal to each other by welding to increase rigidity, in order to block power by breaking the electrode tabs of the battery cells for securing security of a battery at the time of generation of a phenomenon that the battery cells are swelled due to the overcharge in a battery module for a secondary battery.

Technical Solution

In one general aspect, a battery module in which at least one battery cell including an electrode tab including an anode tab and a cathode tab is stacked, includes: a sensing assembly installed in a space between the anode tab and the cathode tab at a side of the battery module at which the electrode tab is positioned; and a terminal installed at the side of the battery module at which the electrode tab is positioned and connected to each of the electrode tabs of the battery cells positioned at the outermost portions, wherein the terminal is bonded and connected to a surface positioned at an inner side of the battery module in both sides of the anode tab and the cathode tab.

The sensing assembly may include a sensing terminal connected to the electrode tabs of the respective battery cells to extract a voltage, a current, or a resistance.

The terminal may include an anode terminal connected to an anode tab that is positioned at the outermost portion of one side of the battery module in a thickness direction, but is not connected to the electrode tab of the battery cell neighboring thereto, and a cathode terminal connected to a cathode tab positioned at the outermost portion of the other side of the battery module in the thickness direction, but is not connected to the electrode tab of the battery cell neighboring.

The terminal and the sensing terminal may be bonded and connected to each other.

The terminal and the sensing terminal may be bonded to each other, and the sensing terminal may be bonded to one surface of the terminal that is not bonded to the electrode tab.

A groove may be formed in a predetermined region of the electrode tab at which the sensing terminal is positioned, such that the electrode tab bonded to the terminal does not surface-contact the sensing terminal.

The terminal, the electrode tab, and the sensing terminal may be bonded to each other by welding.

Advantageous Effects

In the battery module according to the exemplary embodiment of the present invention, when a phenomenon that the battery cell is swelled due to overcharge in a battery module for a secondary battery is generated, the electrode tab of the battery cell is broken in order to secure stability of the battery, thereby blocking power. In this case, the terminal and the sensing terminal are positioned at an inner side of the electrode tab positioned at the outermost portion, such that the electrode tab is easily broken when the battery cell positioned at the outermost portion is separated outwardly, thereby making it possible to effectively block the power.

In addition, the battery module according to the exemplary embodiment of the present invention effectively blocks electricity, thereby making it possible to completely remove a risk such as generation of gas, a fire, an explosion, or the like, due to overheating, or the like, at the time of the overcharge.

Particularly, since the battery module according to the exemplary embodiment is designed so that the electrode tab may be easily broken, the battery module may be easily manufactured and a cost required for manufacturing the battery module may not be substantially increased.

In addition, in the battery module according to the exemplary embodiment, the terminal and the sensing terminal are bonded to each other by the welding, such that an existing cantilever form is changed into a clamped beam form, thereby making it possible to increase rigidity.

DESCRIPTION OF DRAWINGS

The above and other objects, features and advantages of the present invention will become apparent from the following description of preferred embodiments given in conjunction with the accompanying drawings, in which.

BEST MODE

Hereinafter, a battery module according to an exemplary embodiment of the present invention having a configuration as described above will be described in detail with reference to the accompanying drawings.

Figure 1:
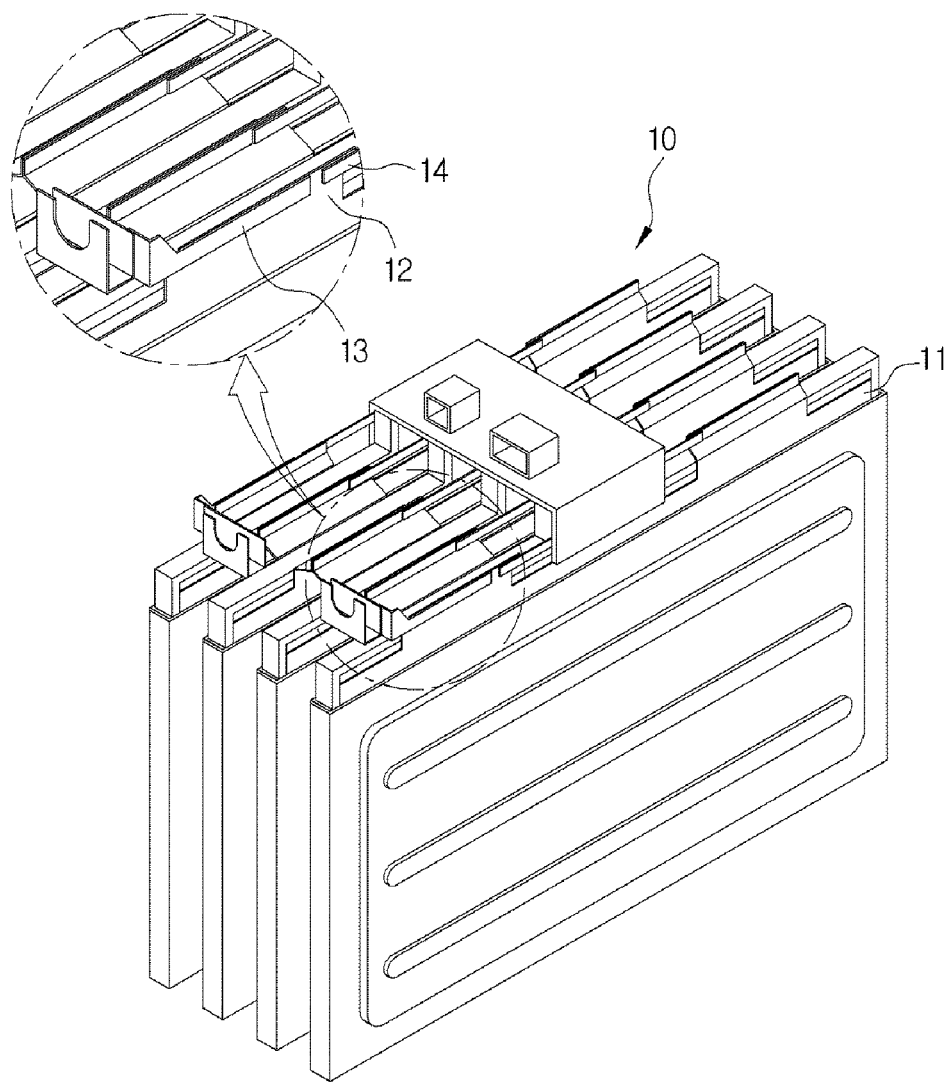
FIG. 1 is a perspective view showing a battery module according to the related art.
Figure 2:
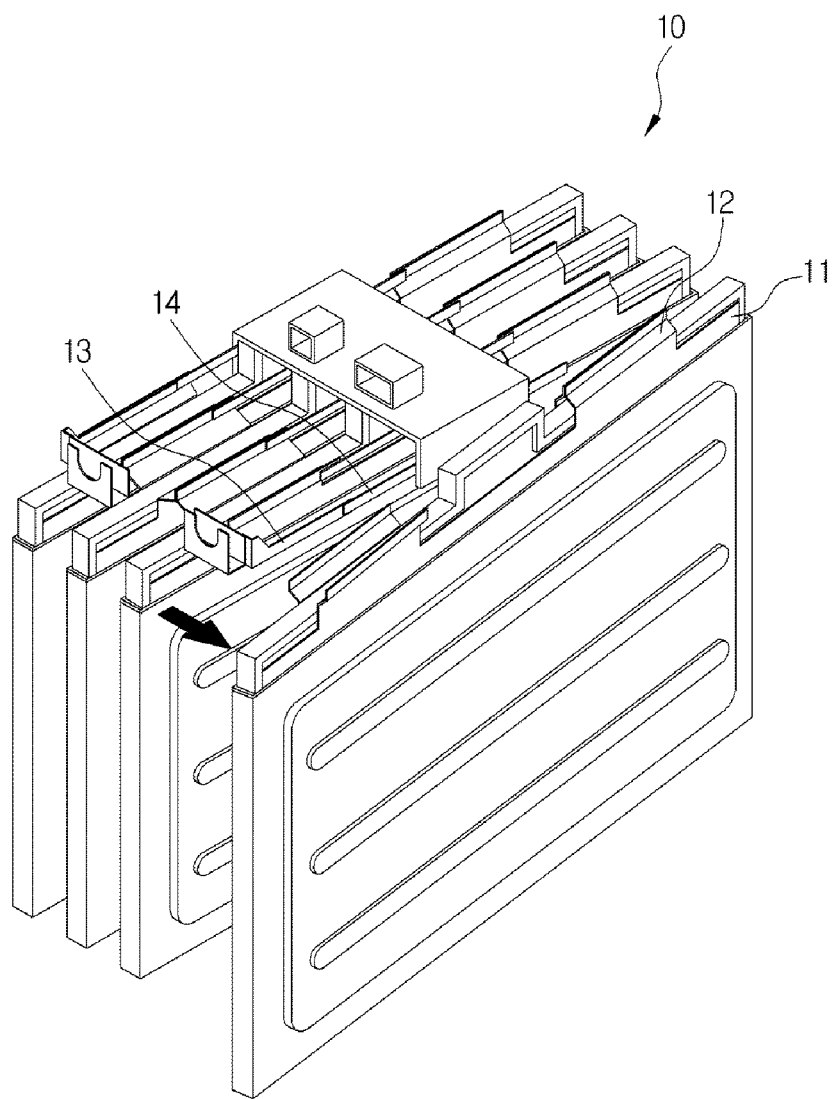
FIG. 2 is a perspective view showing that a battery cell positioned at the outermost portion is separated at the time of overcharge in the battery module according to the related art.
Figure 3:
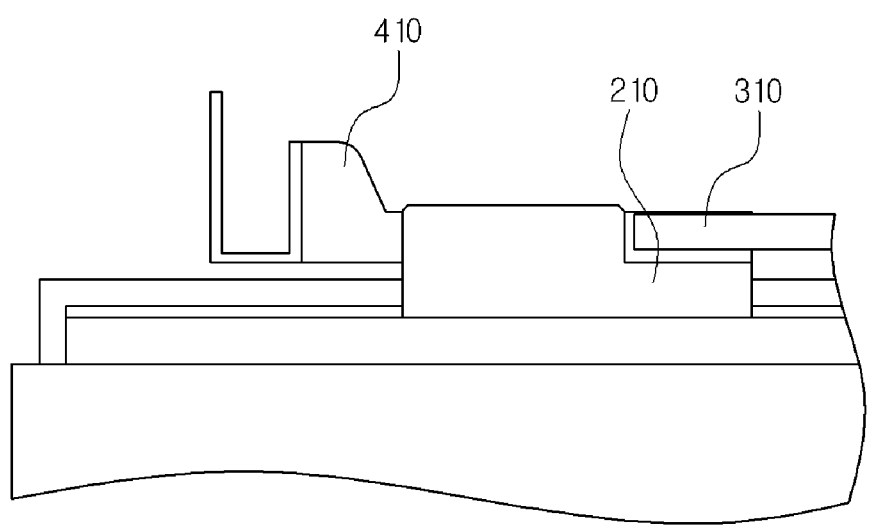
FIG. 3 is a partial front view showing a terminal and a sensing terminal of a battery module according to an exemplary embodiment of the present invention.
Figure 4:
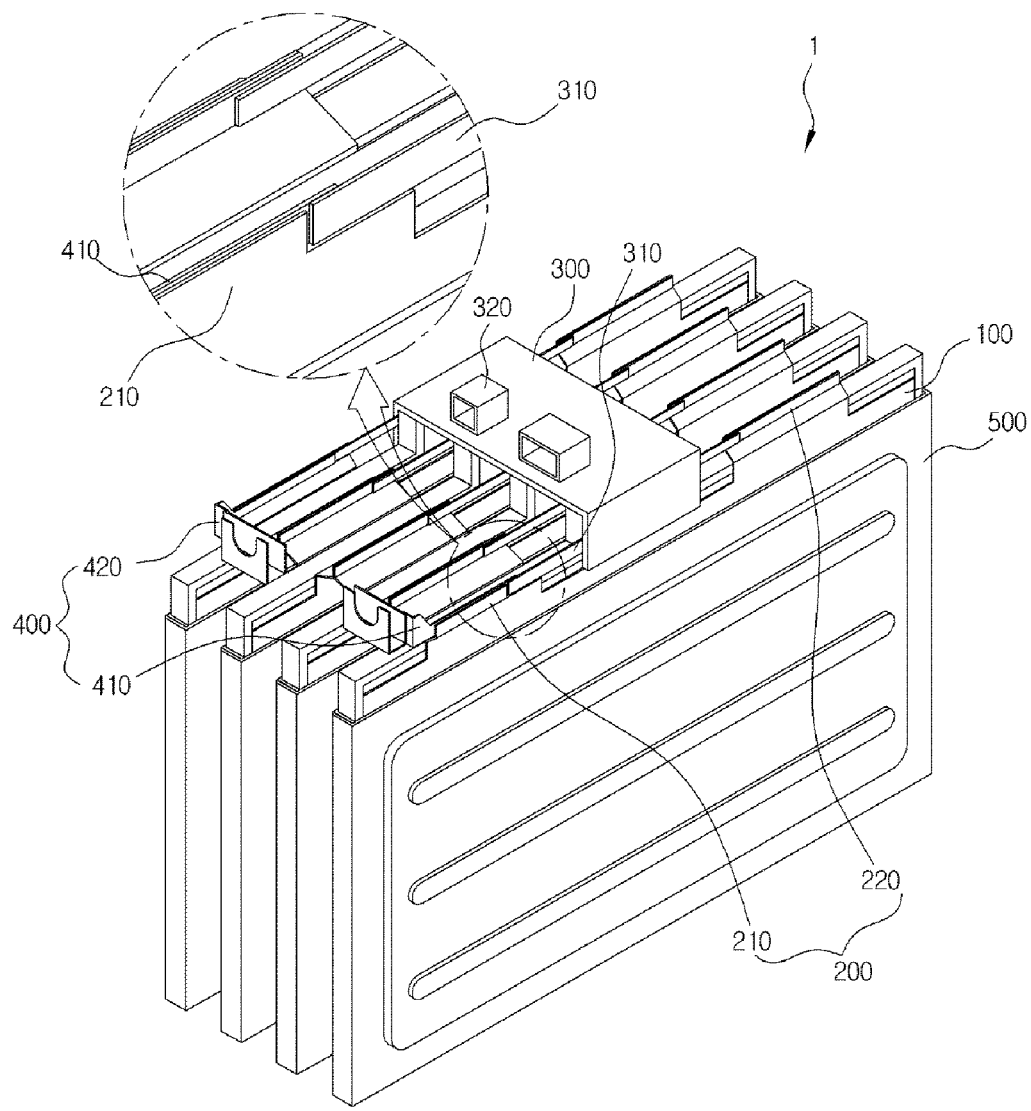
FIG. 4 is a perspective view showing the battery module shown in FIG. 3.
Figure 5:
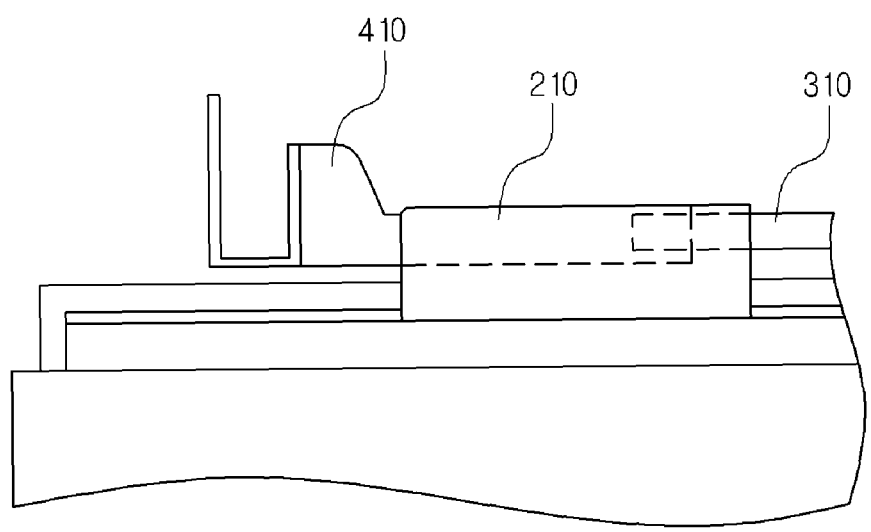
FIG. 5 is a partial front view showing a terminal and a sensing terminal of a battery module according to another exemplary embodiment of the present invention.

FIG. 1 is a perspective view showing a battery module according to the related art; FIG. 2 is a perspective view showing that a battery cell positioned at the outermost portion is separated at the time of overcharge in the battery module according to the related art; FIG. 3 is a partial front view showing a terminal and a sensing terminal of a battery module according to an exemplary embodiment of the present invention; FIG. 4 is a perspective view showing the battery module shown in FIG. 3; and FIG. 5 is a partial front view showing a terminal and a sensing terminal of a battery module according to another exemplary embodiment of the present invention.

The battery module 1 according to the exemplary embodiment of the present invention is configured to include a plurality of plate shaped battery cells 100 and electrode tabs 200, wherein the plurality of battery cells 100 are stacked so that surfaces thereof on which electrode tabs 200 are positioned are the same as each other.

The electrode tabs 200 may be extended from the battery cells 100 in one direction, respectively, include an anode tab 210 and a cathode tab 220, and be welded to the cathode tab 220 or the anode tab 210 neighboring thereto to thereby be connected in series or parallel with the cathode tab 220 or the anode tab 210 neighboring thereto.

Here, the battery module 1 may be a pouch type module including a pouch type case 500 enclosing surfaces other than a surface of the battery cell 100 on which the electrode tab 200 of the battery cell 100 is positioned. In this case, when a module in which the battery cell 100 is enclosed by the pouch type case 500 is called a sub battery module, the battery module 1 may be formed by stacking and disposing at least two sub battery modules in parallel with each other so that surfaces thereof on which the electrode tabs 200 are positioned are the same as each other.

Meanwhile, the battery module 1 according to the exemplary embodiment of the present invention includes a sensing assembly 300 and a terminal 400 installed on a side on which the electrode tab of the battery cell is positioned.

The sensing assembly 300 is positioned in a space between the anode tab 210 and the cathode tab 220 of the battery module and includes a sensing terminal 310, which is a conductor, connected to the electrode tabs 200 of the respective battery cells 100 to extract a voltage, current, or resistance signal.

The sensing assembly 300, which is to extract the voltage, current, or resistance signal from the electrode tabs 200 of the respective battery cells 100, may include a circuit configured by applying a printed circuit board (PCB) if necessary. Here, the sensing terminal 310 is connected to the anode tabs 210 and the cathode tabs 220 of the battery cells 100 to extract the signal and then transmit the extracted signal to a sensing connector 320, and signal information of the battery module may be transmitted to and received from a battery management system through the sensing connector 320.

The terminal 400, which is a component used for connection of a bus bar used to connect several battery modules in series or parallel with each other, includes an anode terminal 410 connected to an anode tab 210 that is positioned at the outermost portion of one side of the battery module in a thickness direction, but is not connected to the electrode tab 200 of the battery cell 100 neighboring thereto, and a cathode terminal 420 connected to a cathode tab 220 positioned at the outermost portion of the other side of the battery module in the thickness direction, but is not connected to the electrode tab 200 of the battery cell 100 neighboring thereto.

Particularly, the battery module 1 according to the exemplary embodiment of the present invention is characterized in that the terminal 400 is bonded and connected to a surface positioned at an inner side of the battery module in both sides of the anode tab 210 and the cathode tab 220, unlike the battery module according to the related art in which the terminal 400 and the sensing terminal 310 are disposed to be bonded to an outer side of the electrode tab 200 positioned at the outermost portion.

Here, the terminal 400 and the sensing terminal 310 are bonded and connected to each other so that the battery module 1 has a clamped beam form rather than an existing cantilever form, thereby making it possible to further improve rigidity.

As shown in FIG. 5, in the battery module 1, the terminal 400 may be bonded to the surface positioned at the inner side of the battery module 1 in both sides of the anode tab 210 and the cathode tab 220, and the sensing terminal 310 may be bonded to one surface of the terminal 400 that is not bonded to the electrode tab 200.

Here, in the battery module 1, the electrode tab 200, the terminal 400, and the sensing terminal 310 are sequentially bonded and connected to each other inwardly from the electrode tab 200 of the battery cell 100 positioned in the outermost portion. That is, the electrode tab 200 and one side of the terminal 400 may be bonded and connected to each other and the other side of the terminal 400 and the sensing terminal 310 may be bonded and connected to each other.

Sequences of the sensing terminal 310 and the terminal 400 may be exchanged with each other. In this case, in the battery module 1, the electrode tab 200, the sensing terminal 310, and the terminal 400 may be sequentially bonded to each other inwardly from the electrode tab 200 of the battery cell 100 positioned in the outermost portion, and the electrode tab 200 and one side of the sensing terminal 310 may be bonded and connected to each other and the other side of the sensing terminal 310 and the terminal 400 may be bonded and connected to each other.

Meanwhile, as shown in FIG. 3, in the battery module 1, a predetermined region of the electrode tab 200 at which the sensing terminal 310 is positioned may be grooved in order for the electrode tab 200 bonded to the terminal 400 not to surface-contact the sensing terminal 310.

The reason is that in the case in which both of the sensing terminal 310 and the terminal 400 are welded to the electrode tab 200, when the battery cell 100 positioned at the outermost portion of the battery module is separated due to overcharge, such that the electrode tab 200 is broken, the breakage may be hindered.

Therefore, in the battery module 1, the electrode tab 200 and one side of the terminal 400 are bonded to each other, the other side of the terminal 400 and the sensing terminal 310 are bonded to each other, and the electrode tab 200 is grooved at a side at which the sensing terminal 310 is positioned, such that the sensing terminal 310 and the electrode tab 200 do not surface-contact each other and are not bonded to each other.

In the battery module 1 shown in FIGS. 3 to 5, the terminal 400, the electrode tab 200, and the sensing terminal 310 may be bonded to each other by welding.

A process in which the electrode tab 200 is broken at the time of overcharge of the battery module 1 according to the exemplary embodiment of the present invention will be described with reference to FIGS. 2 to 5. As described above, in the case in which the battery cell 100 is overcharged or a temperature of the battery becomes excessively high, gas is generated in the battery, such that a volume of the battery cell 100 is expanded.

The battery cells 100 are disposed in parallel with each other in one direction as shown in FIG. 2 to configure one battery module. Therefore, in the case in which each of the battery cells 100 is expanded, a volume of the battery module is also increased.

Therefore, at the time of the overcharge of the battery module, the battery cells 100 are expanded, such that an interval between the battery cells becomes narrow. As a result, the battery cells 100 positioned at the outermost portions of both sides of the battery module are separated, such that the electrode tabs 200 are broken, thereby generating an electrical short circuit.

In the battery module 1, the battery cells 100 are physically and electrically connected to each other by the electrode tabs 200. Therefore, it is obvious that when the electrode tabs 200 are broken due to the separation of the battery cells 100 at the time of the overcharge, power is blocked.

In this case, the sensing terminal 310 and the terminal 400 are positioned at an inner side of the electrode tab 200 positioned at the outermost portion, such that the electrode tab 200 of the battery cell 100 may be effectively broken.

In addition, the battery module according to the exemplary embodiment of the present invention effectively blocks electricity by the above-mentioned method, thereby making it possible to completely remove a risk such as generation of gas, a fire, an explosion, or the like, due to overheating, or the like, at the time of the overcharge.

Particularly, since the battery module according to the exemplary embodiment is designed so that the electrode tab may be easily broken, the battery module may be easily manufactured and a cost required for manufacturing the battery module may not be substantially increased.

In addition, in the battery module according to the exemplary embodiment, the terminal and the sensing terminal are bonded to each other by the welding, such that an existing cantilever form is changed into a clamped beam form, thereby making it possible to increase rigidity.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A battery module comprising:
   two or more battery cells stacked, each battery cell including an electrode tab extended from the battery cell in one direction, the electrode tab including an anode tab and a cathode tab;
   a sensing assembly installed in a space between the anode tabs and the cathode tabs; and
   a terminal including an anode terminal connected to an outmost anode tab positioned at a first outermost portion of the battery module in a thickness direction of the battery module, but not connected to the electrode tab of a neighboring battery cell, and a cathode terminal connected to an outmost cathode tab positioned at a second outermost portion of the battery module in the thickness direction of the battery module, but not connected to the electrode tab of a neighboring battery cell, the second outermost portion being opposite to the first outermost portion in the thickness direction of the battery module,
   wherein the anode terminal is bonded and connected to an inner side surface only of the outmost anode tab, and the cathode terminal is bonded and connected to an inner side surface only of the outmost cathode tab.

2. The battery module of claim 1, wherein the sensing assembly includes a sensing terminal connected to the electrode tabs of the respective battery cells to extract a voltage, a current, or a resistance.

3. The battery module of claim 2, wherein the terminal and the sensing terminal are bonded and connected to each other.

4. The battery module of claim 3, wherein a groove is formed in a predetermined region of the electrode tab at which the sensing terminal is positioned, such that the electrode tab bonded to the terminal does not surface-contact the sensing terminal.

5. The battery module of claim 4, wherein the terminal, the electrode tab, and the sensing terminal are bonded to each other by welding.

6. The battery module of claim 2, wherein the terminal and the sensing terminal are bonded to each other, and the sensing terminal is bonded to one surface of the terminal that is not bonded to the electrode tab.

7. The battery module of claim 6, wherein the terminal, the electrode tab, and the sensing terminal are bonded to each other by welding.

8. The battery module of claim 1, wherein the anode tab and the cathode tab are welded to the cathode tab or the anode tab neighboring thereto to thereby be connected in series or parallel with the cathode tab or the anode tab neighboring thereto.

* * * * *